UNITED STATES PATENT OFFICE.

HENRY A. GARDNER, OF WASHINGTON, DISTRICT OF COLUMBIA.

COLORED CEMENT STRUCTURE AND PROCESS OF MAKING SAME.

1,106,298. Specification of Letters Patent. Patented Aug. 4, 1914.

No Drawing. Application filed October 30, 1913. Serial No. 798,351.

*To all whom it may concern:*

Be it known that I, HENRY A GARDNER, a citizen of the United States, residing at Washington, in the District of Columbia, have invented certain new and useful Improvements in Colored Cement Structures and Processes of Making Same, of which the following is a specification.

This invention relates to processes of making colored bodies or structures of Portland and like cement, and to the structures so produced.

It is characteristic of my process that cement structures colored in accordance therewith are also improved in respect to their resistance to water, and in many cases at least in respect to their hardness or resistance to attrition or wear.

My invention may be carried out as follows: 100 parts of rosin (colophony) are saponified in a solution consisting of about 800 parts of water and 15 parts of caustic soda or potash. A clear aqueous solution of sodium or potassium resinate is thus obtained. To this solution is added 1500 parts, more or less, of a suitable coloring matter, such as chromic oxid, ferric oxid, ultramarine blue or the like. The mixture is thoroughly ground in a paint mill to smooth and even consistence. This pigment composition is then thoroughly mixed, in proportion to give the desired color, with a mixture of cement and water, or of cement, sand and water, according to the result sought. Usually five per cent. of pigment is sufficient to color 100 parts of cement, dry weights of both being referred to. After thoroughly mixing the color with the cement, the composition is permitted to harden in forms in the usual manner. The hardening takes place in about the normal time, and the resulting uniformly colored body is not only nearly or quite waterproof, but is highly resistant to attrition. It may be assumed that the calcium compounds of the cement react with the soluble resinate with formation of an insoluble calcium resinate.

My invention is not restricted to the particular proportions above mentioned as illustrative.

It will be observed that the foregoing process does not involve the use of fatty acids, glycerids, or drying-oils, nor of organic solvents or thinners of any kind The vehicle for the pigment is an aqueous solution of a water-soluble soap prepared from colophony or other suitable resin, the soap solution serving to carry the pigment rapidly and uniformly to every portion of the cementitious mass, and rendering it possible to obtain uniformly colored cement structures.

I claim:—

1. The process of making colored cement structures which consists in intimately commingling a pigment, an aqueous solution of a resin soap, and a calcareous cementitious material, and permitting the mass to harden.

2. The process of making colored cement structures, which consists in compounding a pigment with an aqueous solution of a resin soap, incorporating the resulting mixture with a cement or concrete in proportion to impart the desired color, and permitting the mass to harden.

3. A colored cement structure comprising a calcareous cementitious material, a pigment, and the reaction products of a water-soluble resin soap with said cementitious material.

In testimony whereof I affix my signature in presence of two witnesses.

HENRY A. GARDNER.

Witnesses:
Jos. H. BLACKWOOD,
CHARLES H. POTTER.